UNITED STATES PATENT OFFICE.

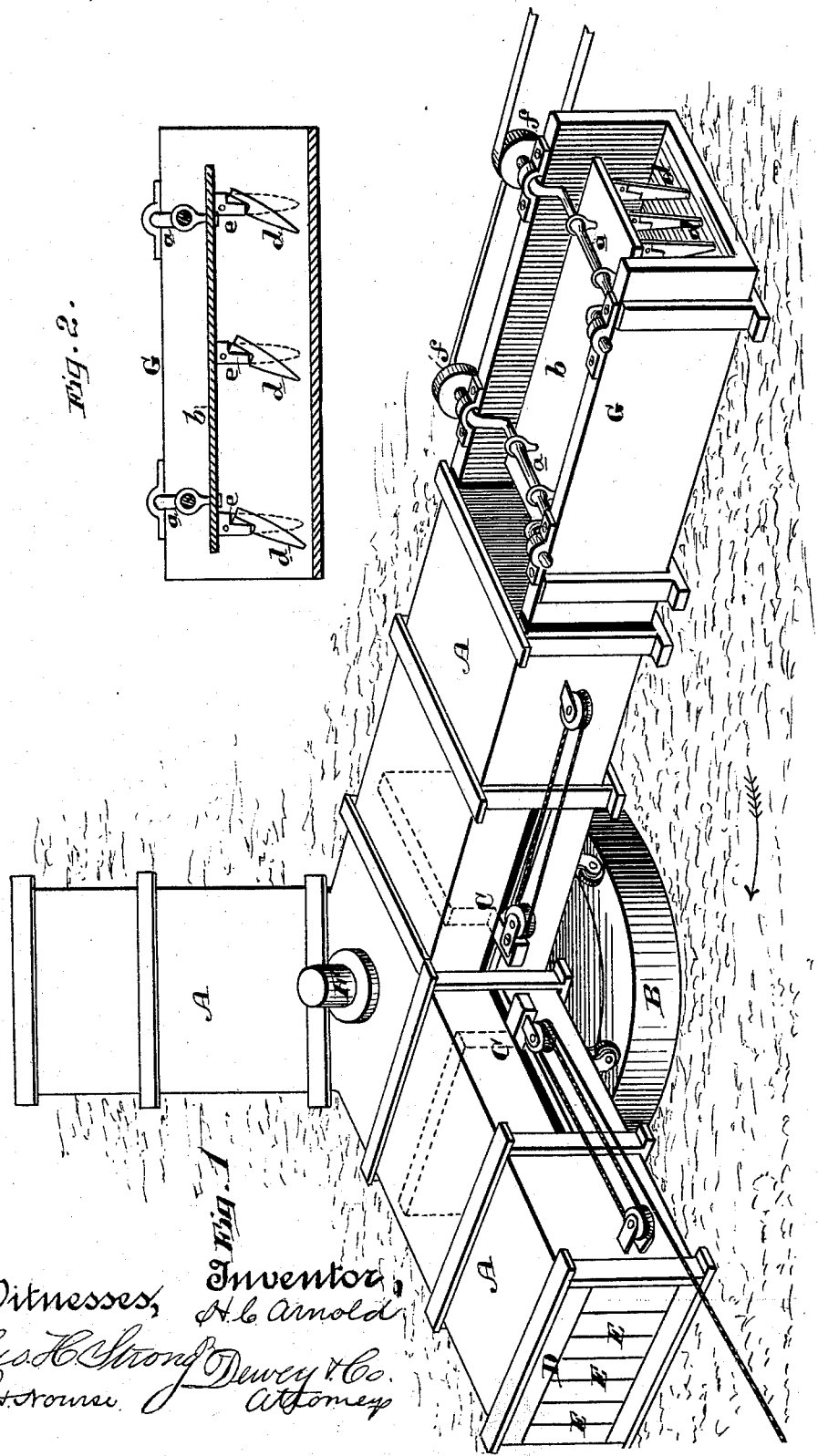

HENRY C. ARNOLD, OF VISALIA, CALIFORNIA.

BALING-PRESS.

SPECIFICATION forming part of Letters Patent No. 268,598, dated December 5, 1882.

Application filed September 25, 1882. (No model.)

*To all whom it may concern:*

Be it known that I, HENRY C. ARNOLD, of Visalia, county of Tulare, State of California, have invented an Improved Baling-Press; and I hereby declare the following to be a full, clear, and exact description thereof.

My invention relates to an apparatus for baling hay, cotton, or other material; and it consists of three boxes of the size and shape necessary to receive the material and form a bale. These boxes are connected with and fixed to a central support, having a stout vertical shaft about which it rotates, with the press-boxes extending outwardly in radial lines from the center and equidistant from each other. Opposite the outer end of one of these press-boxes is a feed-box, through which material is introduced until the press is full. Opposite the next one is a horse or other power, by which the follower is moved and the contents of the press are formed into a bale, which may be tied and ejected when the box reaches the third position. Each press-box is brought opposite the feed-box, then opposite the pressing apparatus, and finally opposite the point of discharge, the work being thus made continuous.

Referring to the accompanying drawings for a more complete explanation of my invention, Figure 1 is a view of my press. Fig. 2 is a section of feeder.

A A A are press-boxes of sufficient length to receive the material for a bale, and having the proper transverse dimensions to give it the desired form. These boxes are fixed upon a central platform or support, B, with one end toward the center and the other ends extending radially outward, the boxes being equidistant from each other; and each box is provided with a follower, C, which is moved from the center outward to press a bale. Doors D are also fixed at the outer end of each box, by which to remove the finished bales, and slots E are made for the cords by which the bales are to be tied. The central platform or support, B, has a strong vertical shaft, F, suitably supported by a framework, and the presses are moved or revolved about this shaft in a horizontal plane, as shown. At any convenient point is fixed a feed box or device, G, through which the hay or other material is introduced to one of the presses A until it is filled. This feed-box may be constructed in various ways. In the present case I have shown two cranked shafts, $a$, extending across the top and turning in boxes near each end. A plate or platform, $b$, is suspended from these cranked shafts, and is provided with arms $d$, which are hinged to its lower side, so as to project downward toward the bottom of the box, as shown. The arms $d$ are so hinged that when by the movement of the cranked arms the platform is carried downward and toward the press-box they will be held rigid by a shoulder, as at $e$, and will thus force any material forward which may be in the box beneath them. When the platform is drawn back by the continued action of the cranks the joint allows the arms $d$ to be turned, as shown in Fig. 2, so as to sweep backward over the material without dragging it out. The cranks are driven by belts and pulleys, as shown at $f$.

It will be manifest that the reciprocating movement of the platform and its arms $d$ may be made without any rotary movement of the same; but the latter is deemed the best, as it allows the largest space for the introduction of the material when the platform is at its highest point, and the material is compressed and forced forward into the press-box as the platform, with its arms, moves downward and forward by the action of the crank.

At a point distant one-third the circumference of the circle described by the outer ends of the press-boxes is placed a horse-power or other mechanism, which may be connected with the follower of a press when the latter is brought opposite the power, and the bale may thus be pressed.

The operation commences by placing one press opposite the feed-box, and when it is full it is turned until it arrives opposite the pressing machinery, which is then connected with its follower and the bale pressed. During this time a second press has stood opposite the feed-box and has been filled, and when the press has been turned to bring this one opposite the power the first bale will be carried around to the place where it is to be discharged, having been tied meanwhile. The doors are then opened and the bale rolled out. Each press as it is brought to the front of the feed-box is filled with loose material. It is then turned to stand opposite the pressing machinery and is pressed, and, lastly, to the point of discharge.

This press is economical, cheap, and is continuous in its operation.

Having thus described my invention, what I claim as new, and desire to secure by Letters Patent, is—

1. In a baling-press, the boxes A, projecting radially and horizontally from a central support and vertical shaft, about which they revolve, substantially as herein described.

2. A baling-press consisting of the horizontally-revolving boxes A, with their outwardly-moving followers C, in combination with a feed-box, G, and a mechanism for moving the followers so placed that when one box is being filled another may have its contents pressed simultaneously, substantially as herein described.

3. In combination with a baling-press, the feed mechanism, consisting of the box G, the reciprocating platform b, with its hinged or jointed arms d, projecting downward into the box, substantially as herein described.

In witness whereof I hereunto set my hand.

HENRY C. ARNOLD.

Witnesses:
G. W. EMERSON,
H. B. APPLEWHAITE.